Patented June 30, 1936

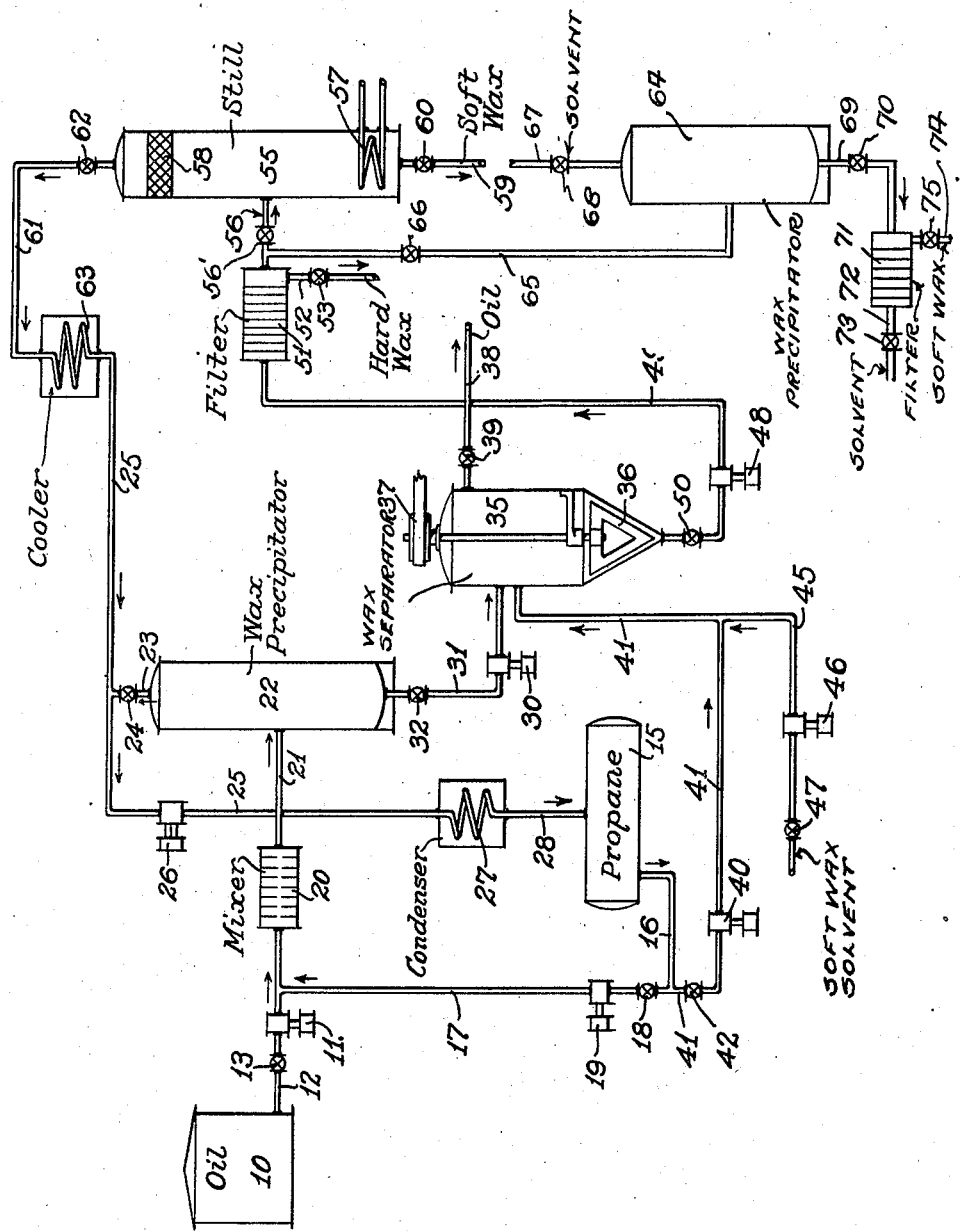

2,045,567

UNITED STATES PATENT OFFICE 2,045,567

PROCESS FOR SEPARATION OF HARD WAX FROM SOFT WAX ASSOCIATED THEREWITH

Le Guay Beynon, Glendale, Calif., assignor to Union Oil Company of California, Los Angeles, Calif., a corporation of California Application February 27, 1934, Serial No. 713,159

18 Claims. (Cl. 196—20)

The present invention relates to a process for separating wax from oils and more particularly it relates to the separate recovery of relatively hard wax and relatively soft wax from mixtures thereof.

Processes are now known for dewaxing oils for the production of lubricating oils wherein liquid, normally gaseous hydrocarbon solvent or diluents, such as liquid propane, are employed. In such processes the wax containing oil is commingled with the diluent under a pressure sufficient to maintain the diluent in the liquid state. At least part of the diluent is vaporized by pressure reduction to cause the remaining solution of oil and diluent to be chilled and thus precipitate the wax. Temperatures of approximately —40° F. may be obtained by the evaporation of the diluent under reduced pressure. The precipitated wax is separated in the presence of the remaining diluent by filtration, settling or centrifuging. When the oil to be dewaxed contains hard and soft waxes, the wax precipitation results in the production of a mixture of these substances. Hard wax is characterized by relatively high specific gravity and high melting point. It is suitable for candle manufacture. Soft wax is relatively lighter and has lower melting point. It is suitable for use in the manufacture of petrolatum.

It is an object of my invention to separate relatively hard wax suitable for candle making from relatively soft wax associated therewith.

The mixture of waxes precipitates in the form of a slurry, which is separated from the bulk of the oil. This slurry comprises hard and soft waxes associated with some oil. The presence of this oil with either the hard or soft wax results in a reduction of the melting point of the waxes, the waxes are less hard at a given temperature and the oil appears to contain color bodies which are undesirable in the wax.

It is another object of my invention to remove from the mixed wax slurry which separates from the bulk of the oil that oil which remains associated with the wax slurry prior to separation of the hard wax from the soft wax.

I have found that this separation of hard from soft wax may be accomplished by utilizing the greater solubility of the soft wax in the presence of solvents. Such solvents may be liquid, normally gaseous hydrocarbons such as methane, ethane, propane, butane, isobutane and mixtures thereof, or other solvents may be employed such as naphtha, benzene, mixtures of benzene and acetone, dichlorethylene, trichlorethylene, methylene chloride, or other solvents characterized by greater solubility for soft wax than for hard wax.

Therefore, it is another object of my invention to separate hard wax from soft wax associated therewith by commingling the wax mixture with solvent to dissolve the soft wax without dissolving the hard wax and separating the undissolved hard wax from the solution of soft wax.

When the solvent employed to dissolve the soft wax is a liquid, normally gaseous substance, the solvent may be maintained in the liquid state under pressure during extraction of the soft wax from the hard wax and the pressure on the solution of soft wax may be reduced to at least partially vaporize the solvent, chilling the mixture by internal refrigeration sufficiently to precipitate the soft wax. Solvent remaining liquid may then be separated from the precipitated wax.

It is a further object of my invention to separate soft from hard wax by commingling the mixture with a liquid, normally gaseous solvent for the soft wax in which the hard wax is insoluble, separating the hard wax from the solution of soft wax and vaporizing sufficient amounts of the normally gaseous solvent to chill the mixture and to precipitate the soft wax from solution.

The drawing is a schematic arrangement of a preferred form of apparatus for carrying out the invention.

Referring to the drawing, oil associated with hard and soft wax is removed from storage tank 10 by pump 11 through line 12 controlled by valve 13. To the oil flowing through line 12 is introduced liquid, normally gaseous hydrocarbon, such as liquid propane, from tank 15 through lines 16 and 17, valve 18 and pump 19. The mixture of waxy oil and propane passes through orifice mixer 20 for thorough intermixture and line 21 into wax precipitator 22 wherein the pressure is sufficiently reduced to cause at least partial vaporization of the liquid, normally gaseous hydrocarbon. This vaporization produces internal refrigeration and precipitation of the wax from the oil. Propane vapors flow through line 23 controlled by valve 24 into line 25. They are compressed in compressor 26 and condensed in coil 27 before return into propane tank 15 through line 28. By sufficient reduction of pressure in wax precipitator 22 temperatures of the order of —40° F. are attained therein. Under these conditions, the wax which precipitates from the oil is a mixture of relatively hard, heavy wax of high melting point and relatively soft, light wax of low melting point. It is desirable to have sufficient normally gaseous hydrocarbon present in the liquid phase after wax precipitation to reduce the viscosity of the mixture and facilitate separation of the precipitated wax from the oil.

The oil with precipitated wax from 22 is then forced by action of pump 30 through line 31 and valve 32 into wax separator 35. In batch operation merely one of such settlers will suffice but to make the process continuous a plurality of these settlers may be employed and may be operated alternately to thus provide for sufficient settling periods. In order to prevent ebullition in the wax settler during the wax settling operation, pressure is imposed upon the solution of oil and normally gaseous hydrocarbon. This is accomplished by pump 30. As the chilled mass in the wax separator remains in a non-ebullient state, the wax settles out and is collected by vanes 36 operated by pulley 37 connected to a suitable source of power not shown. Instead of employing settling for separating the precipitated wax, the separation may be accomplished by filtration or centrifuging. Dewaxed oil is removed via line 38 controlled by valve 39. Wax slurry comprising the precipitated mixed waxes and a relatively small proportion of oil remains in 35.

In order to remove the oil remaining with the mixed wax slurry, the slurry is preferably washed with liquid, normally gaseous hydrocarbon such as liquid propane. This may be accomplished by pumping liquid propane by action of pump 40 through lines 16 and 41 and valve 42 into the wax slurry remaining in separator 35 from which the bulk of oil has been withdrawn.

Oil washed from the wax by means of the liquid, normally gaseous hydrocarbon exits via line 38 controlled by valve 39. The mixed waxes are now in condition for separation into hard and soft wax. If the solvent used for dissolving the soft wax from the hard wax is the same material as that employed for precipitating the wax from the oil in wax separator 22, said material passes by action of pump 40 through lines 16 and 41 into separator 35 to commingle with the washed mixed waxes therein. If a different solvent is employed, this material may enter separator 35 by action of pump 46 and through valve 47 in line 45 connecting with line 41.

The temperature of this mixture in 35 is sufficiently raised to dissolve the soft wax, while the relatively hard wax remains insoluble. Vanes 36 may operate to agitate and thoroughly intermix the waxes and solvent. This mixture is removed from 35 by action of pump 48 in line 49 controlled by valve 50 and passes to filter press 51. Instead of filtering, I may employ settling or centrifuging. When a filter is used the undissolved hard wax remains upon the filter leaves and is withdrawn from the filter via line 52 controlled by valve 53. In order to make the process continuous more than one filter 51 may be employed. The solution of soft wax in the solvent passes from filter 51 to still 55 via line 56 and valve 56'. This still is provided with heating coil 57 through which steam or other heating medium may be passed and a mist extractor 58. Sufficient heat is imparted to the solution to cause vaporization of the solvent from the soft wax. The soft wax substantially free of solvent is removed via line 59 controlled by valve 60. The vapors of the solvent exit via line 61 controlled by valve 62. These vapors may be separately condensed or if they comprise the same material as that employed to precipitate the wax in wax precipitator 22 they may be cooled in cooler 63 and passed through line 25 in the above described manner for condensation.

If the mixed waxes are commingled with a liquid, normally gaseous solvent for the soft wax, the hard insoluble wax is separated by filtration or the like and the solution of soft wax in said normally gaseous solvent passing through line 56 may issue into a wax precipitator 64 via line 65 controlled by valve 66 wherein the pressure is sufficiently reduced to cause substantial vaporization of the normally gaseous hydrocarbon whereby sufficient chilling will be effected to precipitate the soft wax which can be removed from the solution of normally gaseous hydrocarbon remaining liquid by settling, filtering or the like. The solvent vaporized in 64 is withdrawn via line 67 controlled by valve 68. The chilled mixture containing the precipitated soft wax may be withdrawn from the wax precipitator 64 via line 69 controlled by valve 70 and is filtered in filter 71. The solution of solvent remaining liquid is withdrawn via line 72 controlled by valve 73 while the soft wax may be withdrawn from the filter via line 74 controlled by valve 75.

The following is a description of the invention employing liquid propane as a wax precipitant and as a solvent for soft wax. A deasphaltized Santa Fe Springs raffinate produced by extracting a wax containing oil with a mixture of 70% liquid sulphur dioxide and 30% benzene and containing approximately 40% by weight of wax was mixed with sufficient liquid propane so that upon vaporization of part of the propane by pressure reduction to reduce the temperature of the mixture to approximately −42° F., about 500 volume percent. of propane remained in the oil in the liquid state. At this temperature the mixed waxes were precipitated. The mixture of liquid propane, oil and precipitated waxes was then digested under pressure for about 15 minutes in wax separator 35 and the precipitated wax settled from the oil propane solution in the form of a slurry. The oil and propane were removed from the slurry. This wax slurry was washed with further quantities of propane to remove oil associated with the mixed waxes. Liquid propane at a temperature of about 20° F. was intermixed with the washed mixed waxes in the proportion of three volumes propane to one volume of wax and the soft wax was dissolved in the solvent. The mixture was agitated in 35 for complete extraction of soft wax. The hard undissolved wax characterized by a melting point of approximately 130° Ubbelohde was separated from the solution of soft wax in filter 51. The propane solution of soft wax was heated sufficiently to vaporize all the propane therefrom, leaving a soft wax residue characterized by a melting point of approximately 105° Ubbelohde.

The above described process may be modified by omitting the step of washing the oil from the wax slurry. Under these conditions, the mixed waxes are precipitated from the oil, the bulk of oil is removed from the slurry of oil, soft wax and hard wax and the slurry is commingled in 35 with a solvent for the oil and soft wax in which the hard wax is insoluble. After separation of the hard wax by filtration or the like, the oil content of the soft wax is reduced. When a liquid, normally gaseous solvent for the soft wax and oil is commingled with the wax slurry and the insoluble hard wax is removed, the soft wax may be freed from oil associated therewith by partial vaporization of the normally gaseous solvent whereby the temperature is reduced by internal refrigeration and the soft wax is precipitated while the oil remains in solution in the remaining liquid, normally gaseous solvent. The precipitated soft wax can then be recovered by filtration or other separation.

As another modification of my invention, the wax separation may be accomplished in more than two stages of solution to obtain more than two grades of wax. For instance, the mixture of hard and soft waxes may be commingled with the same solvent at successively increased temperatures or may be commingled with different solvents of successively increased solvent power whereby different grades of wax of successively lower solubility are obtained. As previously stated, other solvents than liquid propane for soft wax may be employed and the wax slurry may be washed free of oil by other fluid than liquid propane. Also, the mixed waxes can be obtained by other means than precipitation from oil by liquid, normally gaseous hydrocarbons.

It is to be understood that the above description is merely illustrative of a preferred embodiment of my invention of which many variations may be made by those skilled in the art without departing from the spirit thereof.

I claim:

1. A process for separating hard wax and soft wax from a mixture containing the same which comprises commingling said mixture with a liquefied normally gaseous solvent under such conditions of temperature and pressure that the hard wax is insoluble in the solvent and the soft wax is soluble in the solvent and separating the undissolved hard wax from the solution of soft wax.

2. A process as in claim 1 in which the liquefied normally gaseous solvent is a hydrocarbon.

3. A process as in claim 1 in which the liquefied normally gaseous solvent is liquid propane.

4. A process for separating hard wax and soft wax from a mixture containing the same which comprises commingling said mixture with liquid propane at a temperature of 20° F., separating the undissolved hard wax from the propane solution of soft wax and removing propane from said soft wax.

5. A process for separating hard wax and soft wax from a mixture containing the same which comprises commingling said mixture with a liquefied normally gaseous solvent under such conditions of temperature and pressure that the hard wax is insoluble in the solvent and the soft wax is soluble in the solvent, separating the undissolved hard wax from the solution of soft wax and separating the solvent from the solution of soft wax.

6. A process for separating hard wax and soft wax from a mixture containing the same which comprises commingling said mixture with a liquefied normally gaseous solvent under such conditions of temperatures and pressures that the hard wax is insoluble in the solvent and the soft wax is soluble in the solvent, separating the solution of soft wax from the hard wax, chilling the solution of soft wax to precipitate the soft wax and separating the solvent from the precipitated soft wax.

7. A process as in claim 6 in which the chilling to precipitate the soft wax from solution is accomplished by vaporizing a portion of the solvent under reduced pressure.

8. A process as in claim 6 in which the solvent is a hydrocarbon.

9. A process as in claim 6 in which the solvent is liquid propane.

10. A process for separating hard wax and soft wax from oil containing the same which comprises chilling the oil to precipitate both hard and soft wax, separating the precipitated hard and soft wax as a mixture from the oil, commingling said mixture with a liquefied normally gaseous solvent under such conditions of temperature and pressure that the hard wax is insoluble in the solvent and the soft wax is soluble in the solvent and separating the undissolved hard wax from the solution of soft wax.

11. A process as in claim 10 in which the liquefied normally gaseous solvent is a hydrocarbon.

12. A process as in claim 10 in which the liquefied normally gaseous solvent is liquid propane.

13. A process for separating hard and soft wax from oil containing the same which comprises chilling said oil to separate a slurry of oil, hard and soft wax, washing said slurry with a solvent to remove oil from the mixture of hard and soft wax, commingling said mixture with a liquefied normally gaseous solvent under such conditions of temperature and pressure that the hard wax is insoluble in the solvent and the soft wax is soluble in the solvent and separating the undissolved hard wax from the solution of soft wax.

14. A process as in claim 13 in which the solvent employed to wash the slurry of oil, hard and soft wax, is a liquefied normally gaseous hydrocarbon.

15. A process for separating hard and soft wax from oil containing the same which comprises chilling said oil to approximately —40° F. to separate a slurry of oil, hard and soft wax, washing said slurry with a solvent to remove oil from the mixture of hard and soft wax, commingling said mixture of hard and soft wax with a liquefied normally gaseous solvent at approximately 20° F. to dissolve the soft wax and to leave the hard wax undissolved and separating the undissolved hard wax from the solution of soft wax.

16. A process for separating hard and soft wax from oil containing the same which comprises mixing said oil with a normally gaseous hydrocarbon under sufficient pressure to maintain said hydrocarbon in the liquid phase, chilling the mixture to precipitate both hard and soft wax as a mixture, separating the mixture of hard and soft wax and commingling said mixture with a liquefied normally gaseous hydrocarbon under such temperature and pressure conditions that the hard wax is insoluble in the solvent and the soft wax is soluble in the solvent and separating the undissolved hard wax from the solution of soft wax.

17. A process as in claim 16 in which the liquefied normally gaseous hydrocarbon is liquid propane.

18. A process for separating hard and soft wax from oil containing the same which comprises mixing said oil with a normally gaseous hydrocarbon under sufficient pressure to maintain said hydrocarbon in the liquid phase, chilling the mixture to precipitate both hard and soft wax as a mixture, separating the mixture of hard and soft wax and commingling said mixture with a liquefied normally gaseous hydrocarbon under such temperature and pressure conditions that the hard wax is insoluble in the solvent and the soft wax is soluble in the solvent, reducing the pressure on the solution of soft wax to vaporize part of the solvent and thereby chilling the mixture to precipitate the soft wax and separating the soft wax from the remaining solvent.

LE GUAY BEYNON.